US010099594B2

(12) United States Patent
Salinas et al.

(10) Patent No.: US 10,099,594 B2
(45) Date of Patent: Oct. 16, 2018

(54) ADJUSTABLE CUP HOLDER BASE HEIGHT

(71) Applicant: Ford Global Technologies, LLC, Dearborn, MI (US)

(72) Inventors: Fernando Cesar Salinas, Brighton, MI (US); Robert G. Newton, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/225,288

(22) Filed: Aug. 1, 2016

(65) Prior Publication Data
US 2018/0029514 A1    Feb. 1, 2018

(51) Int. Cl.
*B60N 3/10* (2006.01)

(52) U.S. Cl.
CPC ..................... *B60N 3/105* (2013.01)

(58) Field of Classification Search
CPC .......... B60N 3/105; B60N 3/10; B60N 3/102; B60N 3/103; B60N 3/106; B60N 3/107
See application file for complete search history.

(56) References Cited

U.S. PATENT DOCUMENTS

| 5,072,909 A | 12/1991 | Huang | |
| 5,634,621 A * | 6/1997 | Jankovic | B60N 3/102 224/926 |
| 5,930,887 A | 8/1999 | Tomita et al. | |
| 6,092,775 A | 7/2000 | Gallant | |
| 6,637,709 B1 | 10/2003 | Guenther et al. | |
| 6,695,271 B2 | 2/2004 | Bieck et al. | |
| 7,036,700 B2 * | 5/2006 | Engel | B60N 3/106 224/501 |
| 7,354,086 B2 * | 4/2008 | Park | B60N 3/10 224/926 |
| 7,497,409 B2 | 3/2009 | Lawlor | |
| 7,562,854 B2 * | 7/2009 | Bieck | B60N 3/102 224/926 |
| 7,694,928 B2 * | 4/2010 | Lee | B60N 3/101 224/281 |
| 7,757,888 B2 * | 7/2010 | Ogura | B60N 3/102 220/345.1 |
| 9,016,650 B2 | 4/2015 | Thurman et al. | |
| 2005/0269472 A1 * | 12/2005 | Wagner | B60N 3/102 248/311.2 |
| 2006/0243875 A1 * | 11/2006 | Chen | B60N 3/106 248/311.2 |
| 2011/0012396 A1 * | 1/2011 | Laake | B60N 2/4606 297/188.14 |

(Continued)

FOREIGN PATENT DOCUMENTS

CN     102951058 A  *  3/2013  ............... B60N 3/10

*Primary Examiner* — Corey Skurdal
(74) *Attorney, Agent, or Firm* — Vichit Chea; Price Heneveld LLP (57) ABSTRACT

A vehicle cup holder assembly having a cup holder defining an interior volume and a cup holder base having a depth relative to a top surface of the cup holder. A spring may be positioned between a bottom edge of the cup holder base and a console bottom surface. The cup holder assembly may have a user interface. The cup holder assembly may also have a side member of the cup holder base positioned in a side space. The depth of the cup holder base may be adjusted by a mechanism controlled by the user interface.

20 Claims, 8 Drawing Sheets

(56) References Cited

U.S. PATENT DOCUMENTS

2014/0367433 A1 12/2014 Rifel et al.
2015/0201780 A1* 7/2015 Yokota ................... B65D 21/08
 220/720
2017/0174142 A1* 6/2017 Wang ........................ B60R 7/04

* cited by examiner

FIG. 11

ADJUSTABLE CUP HOLDER BASE HEIGHT

FIELD OF THE INVENTION

The present invention generally relates to a cup holder assembly for use in a console of a motor vehicle and, more specifically, to a cup holder assembly having a cup holder base which can be adjusted.

BACKGROUND OF THE INVENTION

Vehicles often have fixed cup holders disposed in the console for storing beverages and other items for the vehicle occupants. Storage space in a vehicle console is limited and it is necessary to provide a variety of options for the vehicle occupants to tailor the spaces available to suit their needs.

The present invention provides a cup holder assembly that can be adjusted to change the depth and interior volume of the cup holder.

SUMMARY OF THE INVENTION

According to one aspect of the present invention, an adjustable vehicle cup holder assembly has a cup holder defining an interior volume, a cup holder base having a depth relative to a top surface of the cup holder, a spring positioned between a bottom edge of the cup holder base and a console bottom surface, a user interface, and a mechanism to adjust the depth of the cup holder base wherein the mechanism is controlled by the user interface.

According to another aspect of the present invention, a vehicle cup holder assembly has a cup holder defining an interior volume, a cup holder base having a depth relative to a top surface of the cup holder, a user interface, and a mechanism to adjust the depth of the cup holder base wherein the mechanism is controlled by the user interface.

According to another aspect of the present invention, a method for adjusting a depth within a cup holder includes the steps of receiving a beverage container in the cup holder wherein the beverage container is positioned on a cup holder base, initiating a user interface to activate a mechanism to raise or lower the cup holder base, and adjusting the cup holder base to the depth that accommodates the beverage container.

These and other features, advantages, and objects of the present device will be further understood and appreciated by those skilled in the art upon studying the following specification, claims, and appended drawings.

DETAILED DESCRIPTION OF THE PREFERRED EMBODIMENTS

Figure 1:
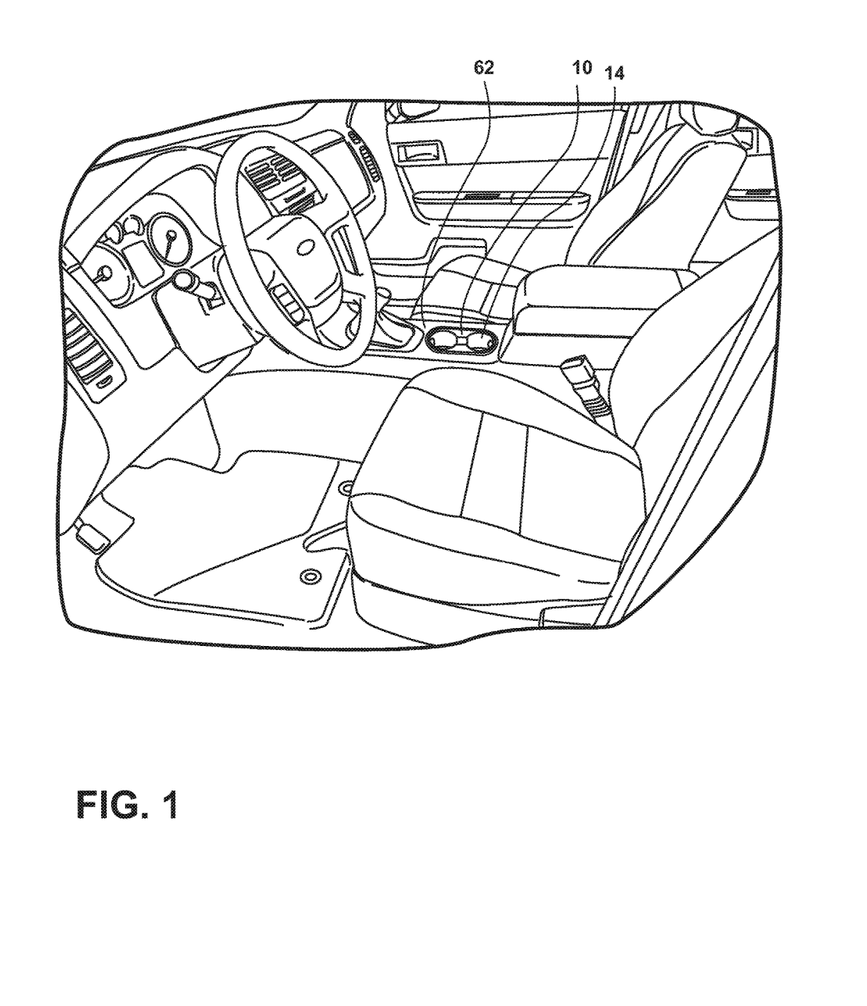
FIG. 1 shows a vehicle cup holder mounted to a vehicle center console according to one aspect of the present invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," wherein used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-11, reference numeral 10 generally designates a vehicle cup holder assembly having an adjustable depth configured for holding beverage containers and other objects in a vehicle. The cup holder assembly 10 generally has a cup holder 14 defining an interior volume 18, and a cup holder base 22 having a depth 26 relative to a top surface 30 of the console 62. A spring 34 may be positioned between a bottom edge 38 of the cup holder base 22 and a console bottom surface 42. The cup holder assembly 10 may have a user interface 46. The cup holder assembly 10 may also have a mechanism (not shown) to adjust the depth 26 of the cup holder base 22 wherein the mechanism is controlled by the user interface 46.

Referring now to FIG. 1, the cup holder assembly 10 is generally intended for use inside a vehicle and is exemplarily shown located in a vehicle center console 62. However, it should be appreciated that the cup holder assembly 10 may be located in other areas of the vehicle that are viewable and accessible to a vehicle passenger. The vehicle cup holder assembly 10 can be paired with one or more cup holders 14 and the cup holder assembly 10 can be positioned elsewhere in the console 62 or other locations in the vehicle, for example, doors and rear console areas.

Figure 2:
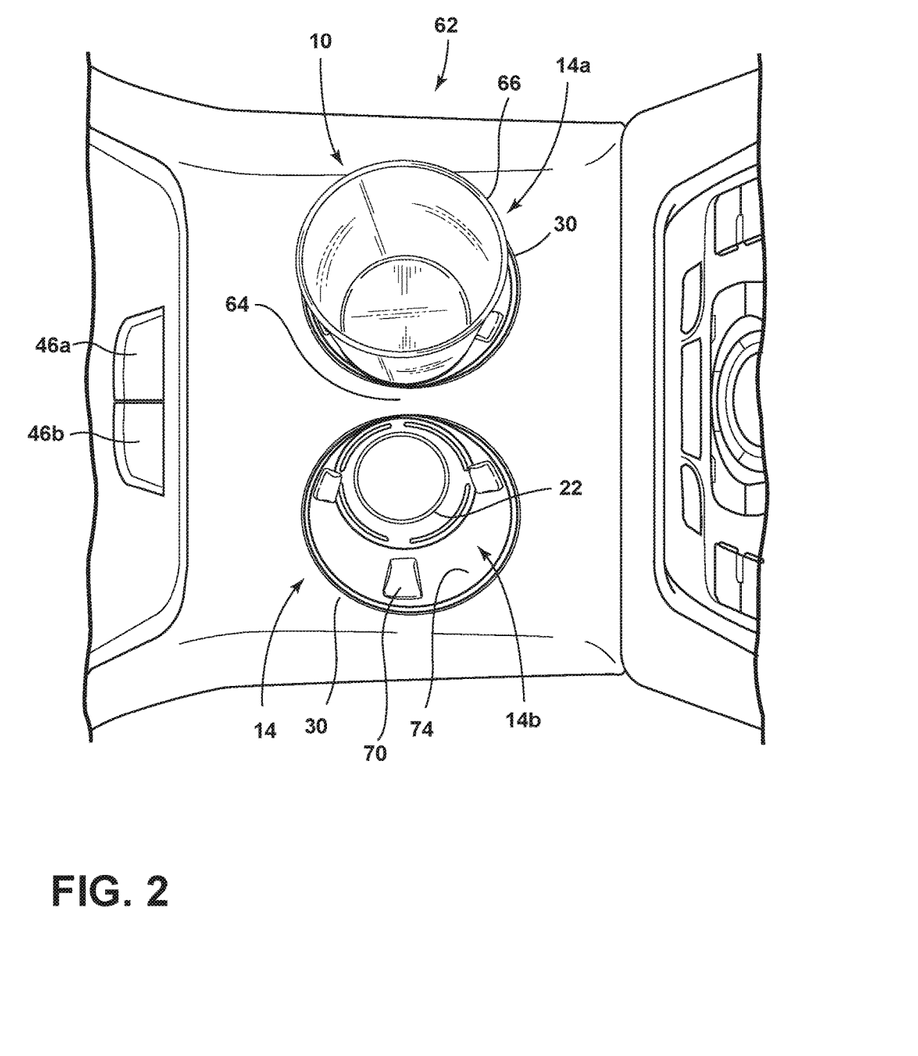
FIG. 2 is a top perspective view of the cup holder assembly according to one embodiment positioned within a center console.

With reference to FIG. 2, the cup holder assembly 10 is shown having two cup holders 14 in a horizontal configuration. In other embodiments, the cup holders 14 may be in a vertical configuration and may also be configured to hold more than two cups or containers. The cup holder assembly 10 may be constructed from a rigid or flexible material and may be configured in a variety of shapes, sizes, and colors. As shown in FIG. 2, in some embodiments of the invention, the cup holder assembly 10 includes a first cup holder 14a which is connected to a second cup holder 14b via an intermediate section 64. In this configuration, the first cup holder 14a and the second cup holder 14b make up the cup holder assembly 10 formed in the console 62 of the vehicle. The cup holder 14 may have retractable spacers 70 positioned in a side wall 74 to fittedly contain the beverage container 66. The cup holder assembly 10 has a top surface 30 that is positioned to be even with the surface of the console 62 and the cup holder base 22 forming a bottom boundary of the interior volume 18 of the cup holder 14. In some embodiments, the cup holder base 22 may have the shape of a circle. The first cup holder 14a has a first user interface 46a and the second cup holder 14b has a second user interface 46b where both the first and second user interfaces 46a, 46b allow a user to activate an assembly to vary the depth of the cup holders 14a, 14b. With specific reference to the cup holder 14, the interior volume 18 of the cup holder 14 is generally defined by the cup holder base 22 and a substantially continuous side wall 74 upwardly extending from the cup holder base 22.

The user interface 46 of the cup holder assembly 10 enables the user to adjust the depth 26 of the cup holder 14 with the mechanism. The user interface 46 can be any design or structure known in the art to allow a user to interact, control, and/or connect to the mechanism (not shown) of the cup holder assembly 10. Some non-limiting examples of different types of user interfaces 46 are a knob, a switch, a toggle, a button, and/or a touch screen. Depending on the embodiment, the mechanism can be a motorized assembly (FIG. 3), a finger operated actuator assembly (FIG. 6), or a solenoid assembly (FIG. 9) as discussed below.

Figure 3:
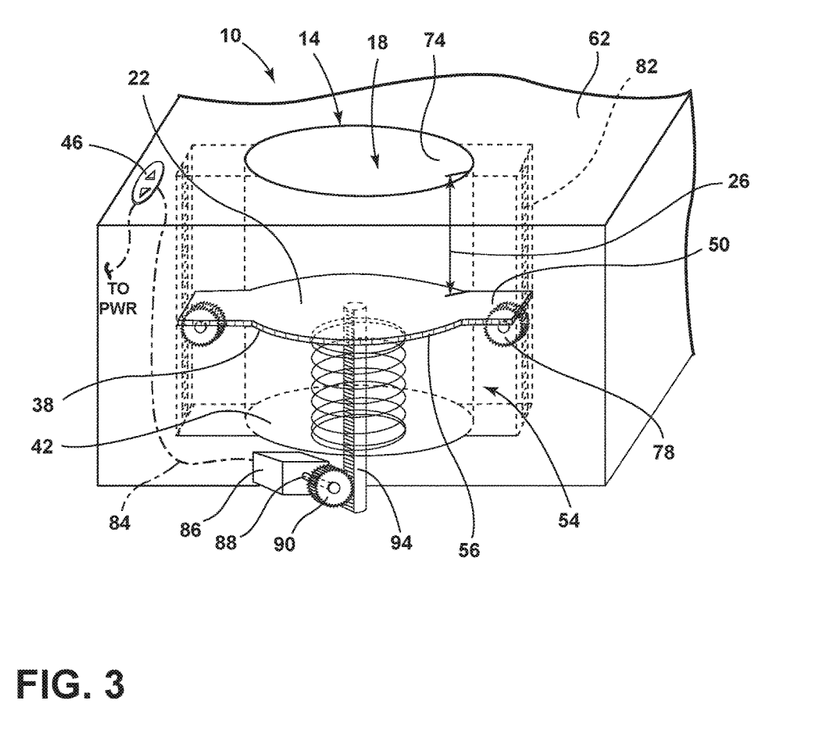
FIG. 3 is a partially schematic cross-sectional view of a portion of the cup holder assembly according to one embodiment.
Figure 4:
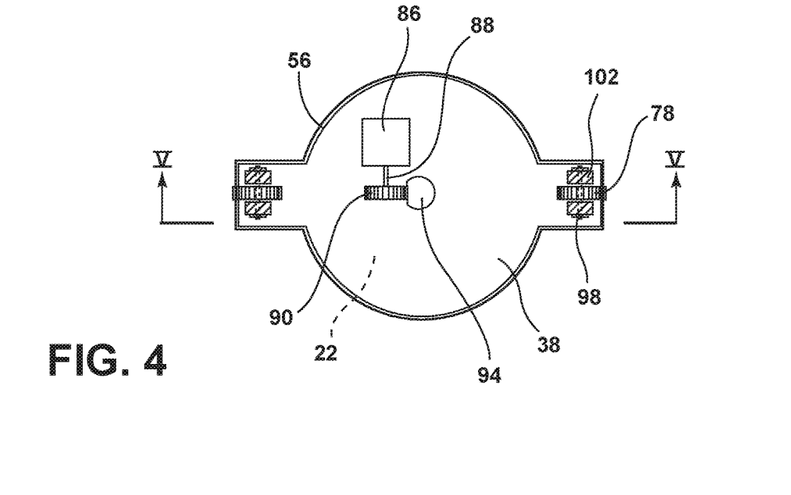
FIG. 4 is a partially schematic fragmentary cross-sectional bottom view of the cup holder assembly of FIG. 3.

Referring now to FIG. 3, the cup holder assembly 10 has the cup holder 14 with the interior volume 18 that is defined by the substantially continuous side wall 74 upwardly extending from the cup holder base 22 up to the top surface 30 of the console 62. In some embodiments, like that shown in FIG. 3, the cup holder 14 and cup holder base 22 has the shape of a bowtie to accommodate a cellphone or other flat device. The depth 26 of the cup holder 14 is measured from a top edge of the cup holder base 22 up to the top surface 30 of the console 62. In some embodiments, the side member 50 is coupled to the cup holder base 22 and the side member 50 is positioned in the side space 54 of the cup holder assembly 10 to give the bowtie appearance. A rubber lip 56 is coupled to the perimeter of the cup holder base 22 to contact the console 62 and can be made from any dual durometer material that provides flexibility and a slidable surface. A pinion gear 78 is coupled to the side member 50 of the cup holder base 22 (bowtie shape) with a pinion rod 98 (FIG. 4) and a retaining clip 102 (FIG. 4). In some embodiments, the pinion gear 78 is coupled to the bottom edge 38 of the cup holder base 22 with a pinion rod 98 and a retaining clip 102. The user interface 46 has one or more electrical wires 84 coupled to a power source (not shown) and a motor 86. The motor 86 is coupled to a motor pinion gear 90 which is movably coupled to a movable vertical rack 94. The spring 34 is positioned between the bottom edge 38 of the cup holder base 22 and the console bottom surface 42. The mechanism described in FIG. 3 is a motorized assembly and the user interface is an up/down switch, and the motorized assembly is made of the motor 86, the motor pinion gear 90, and the movable vertical rack 94 coupled to the cup holder base 22.

Referring now to FIG. 4, a bottom view of the cup holder base 22 is shown where the motor 86 is coupled to the motor pinion gear 90 through a motor shaft 88. The motorized movement of the motor pinion gear 90 allows the raising and lowering of the cup holder base 22 through the motor pinion gear 90 rotatably moving the movable vertical rack 94. As the cup holder base 22 is raised and lowered by the motor 86, movable vertical rack 94, and motor pinion gear 90, the pinion gear 78 is movably coupled to the vertical rack 82 to provide stabilization for the cup holder base 22. The rubber lip 56 is coupled to the cup holder base 22 and the rubber lip 56 makes contact with the console 62. In some embodiments, the movable vertical rack 94 is coupled to the bottom edge 38 of the cup holder base 22 so the movable vertical rack 94 and the cup holder base 22 can form a single member.

Figure 5:
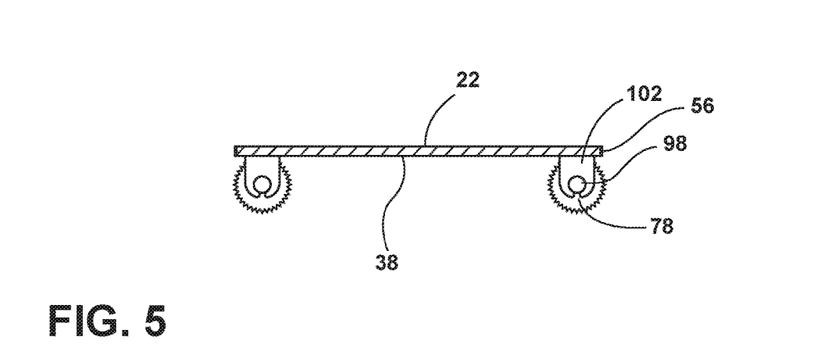
FIG. 5 is a partially schematic fragmentary cross-sectional view of a portion of the cup holder base of FIG. 3 taken along the line V-V.

Referring now to FIG. 5, a partially schematic fragmentary cross-sectional view of a portion of the cup holder base 22 of FIG. 4 is shown taken along the line V-V. The cup holder base 22 is shown with a retaining clip 102 coupled to the pinion rod 98 and pinion gear 78. In some embodiments, the retaining clip 102, pinion rod 98, and pinion gear 78 are coupled directly to the bottom edge 38 of the cup holder base 22 and in other embodiments, may be coupled directly to the bottom edge 38 of the side member 50.

Figure 6:
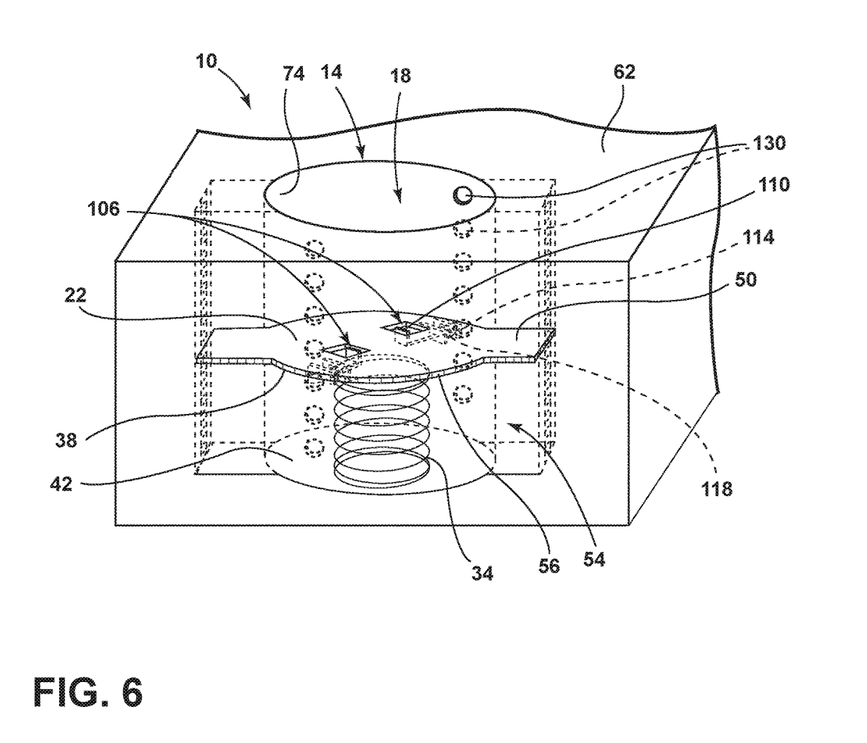
FIG. 6 is a partially schematic cross-sectional view of a portion of the cup holder assembly according to another embodiment.

With reference to FIG. 6, the cup holder assembly 10 has the cup holder 14 with the interior volume 18 that is defined by the substantially continuous side wall 74 upwardly extending from the cup holder base 22 up to the top surface 30 of the console 62. The rubber lip 56 is coupled to the perimeter of the cup holder base 22 to contact the console 62 and can be made from any dual durometer material that provides flexibility and a slidable surface. One or more member openings 106 are formed in the cup holder base 22 where a sliding member 110 that can both retract and extend an actuator rod 114 that is positioned in the one or more member openings 106. By pulling in or retracting the actuator rod 114 with the sliding member 110, the actuator rod 114 is pulled out of an assembly hole 130 and the cup holder base 22 is free to move up and down in the cup holder assembly 10 to a desired depth 26. The spring 34 is positioned between the bottom edge 38 of the cup holder base 22 and the console bottom surface 42. In some embodiments, the side member 50 may be coupled to the cup holder base 22 and be positioned in the side space 54 to add stabilization to the cup holder assembly 10. The mechanism described in FIG. 6 is a finger operated actuator assembly while the user interface 46 is the member opening 106; where the side wall 74 of the cup holder 14 has a plurality of assembly holes 130 to house the actuator rod 114.

Figure 7:
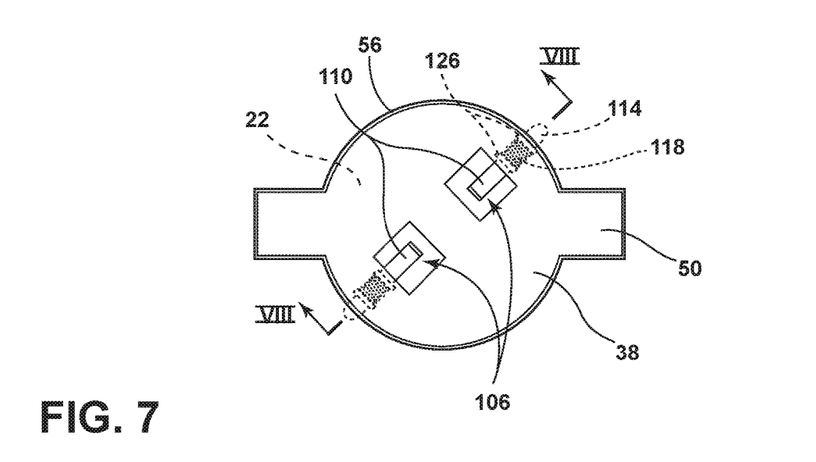
FIG. 7 is a partially schematic fragmentary cross-sectional bottom view of the cup holder assembly of FIG. 6.

Referring now to FIG. 7, a bottom view of the cup holder base 22 is shown having the actuator assembly. The rubber lip 56 is coupled to the cup holder base 22 and the rubber lip 56 makes contact with the console 62. The sliding member 110 can be seen in the member opening 106 and the sliding member 110 can be used to extend and retract the actuator rod 114. An actuator spring 118 assists in the extension of the actuator rod 114 into the assembly hole 130 upon reaching the desired height for the cup holder 14.

Figure 8:
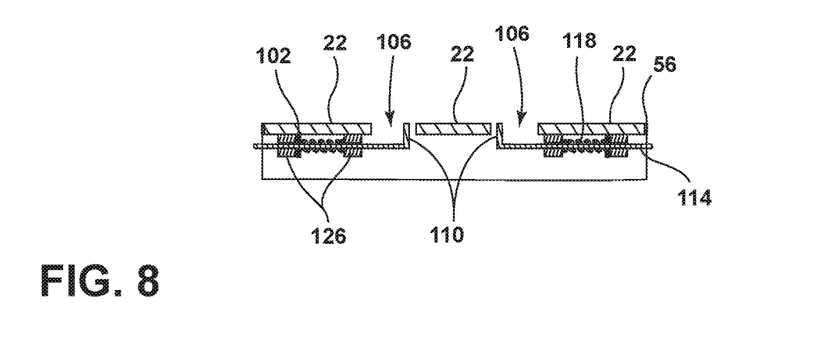
FIG. 8 is a partially schematic fragmentary cross-sectional view of a portion of the cup holder base of FIG. 7 taken along the line VIII-VIII.

With reference to FIG. 8, a partially schematic fragmentary cross-sectional view of a portion of the cup holder base 22 of FIG. 7 taken along the line VIII-VIII is shown. The sliding member 110 can be seen in the member opening 106 and can be used to extend and retract the actuator rod 114.

The actuator rod 114 is connected to the actuator spring 118 where the actuator spring 118 is positioned between two retaining members 126 with a retaining clip 102 connecting the spring to the actuator rod 114. In some embodiments, the sliding member 110 can be activated or initiated by the fingers of the user.

Figure 9:
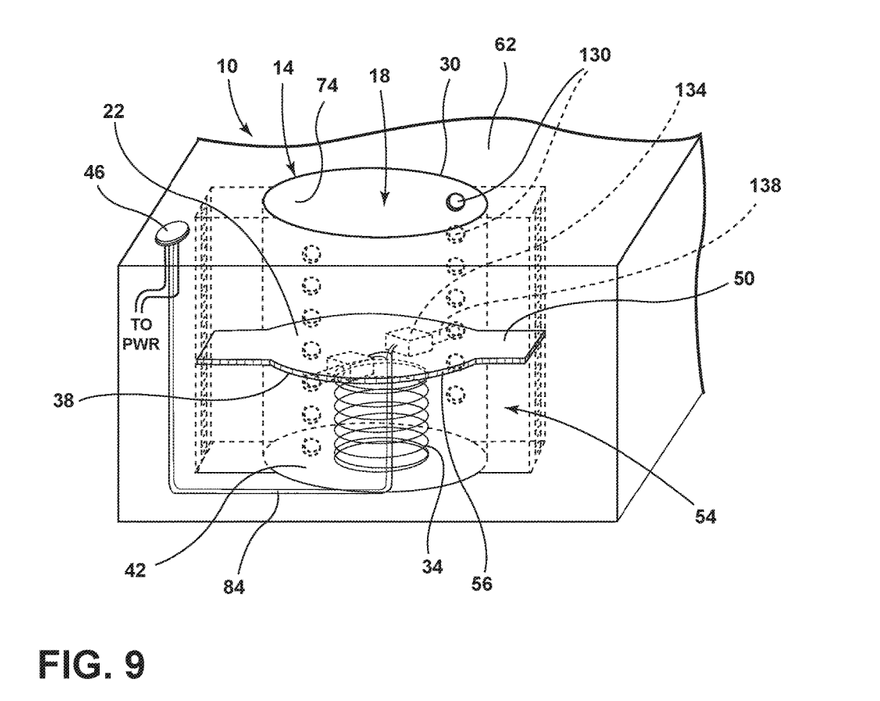
FIG. 9 is a partially schematic cross-sectional view of a portion of the cup holder assembly according to another embodiment.

With reference to FIG. 9, the cup holder assembly 10 has the cup holder 14 with the interior volume 18 that is defined by the substantially continuous side wall 74 upwardly extending from the cup holder base 22 up to the top surface 30 of the console 62. The depth 26 of the cup holder 14 is measured from the cup holder base 22 to the top surface 30 of the console 62. The rubber lip 56 is coupled to the perimeter of the cup holder base 22 to contact the console 62 and can be made from any dual durometer material that provides flexibility and a slidable surface. The user interface 46 has one or more electrical wires 84 that connect to the power source (not shown) and to a solenoid 134. The solenoid 134 is coupled to a plunger 138 that can be extended and retracted from the assembly hole 130. Upon activation of the solenoid 134 through the user interface 46, the plunger 138 may be retracted allowing the cup holder base 22 to move freely upwards with the assistance of the spring 34 positioned between the bottom edge 38 and the console bottom surface 42. When the user reaches the desired depth 26 of the cup holder 14, the user can stop sending power to the solenoid 134 and the plunger 138 will extend out into the nearest assembly hole 130. In some embodiments, the side member 50 can be coupled to the cup holder base 22 and be positioned in the side space 54 of the cup holder assembly 10 to add stability to the cup holder 14. When power is ceased to the solenoid 134 and the plunger 138 is not directly aligned to extend into the assembly hole 130, the user can either slightly raise or lower the cup holder base 22 until the plunger 138 and assembly hole 130 align. The mechanism described in FIG. 9 is a solenoid assembly and the user interface 46 is an initiator switch and the side wall 74 of the cup holder 14 has the plurality of assembly holes 130 to house the plunger 138.

Figure 10:
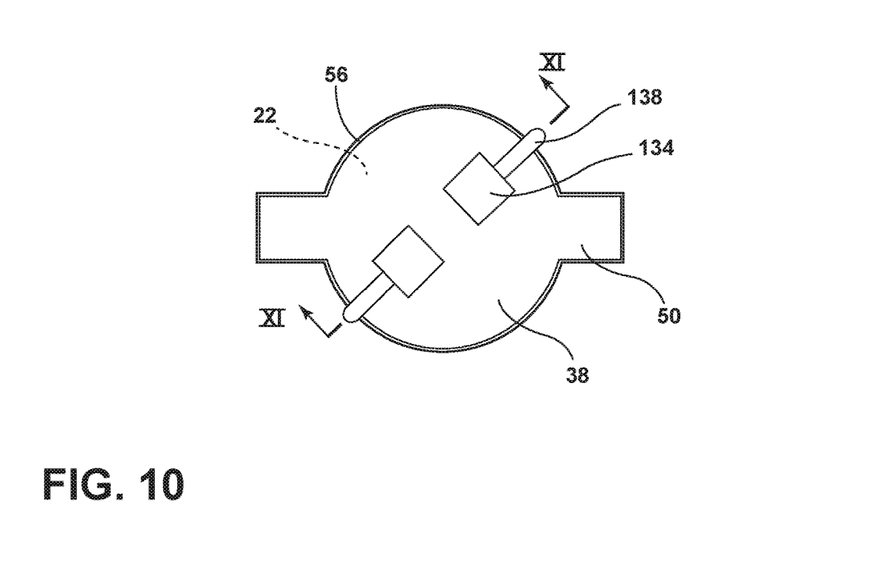
FIG. 10 is a partially schematic fragmentary cross-sectional bottom view of the cup holder assembly of FIG. 9.

With reference to FIG. 10, a bottom view of the cup holder base 22 is shown. The rubber lip 56 is coupled to the cup holder base 22 and the rubber lip 56 makes contact with the console 62. The solenoid 134 is coupled to the plunger 138. The spring 34 is shown compressed between the bottom edge 38 of the cup holder base 22 and the plunger 138 is shown positioned in the assembly hole 130.

Figure 11:
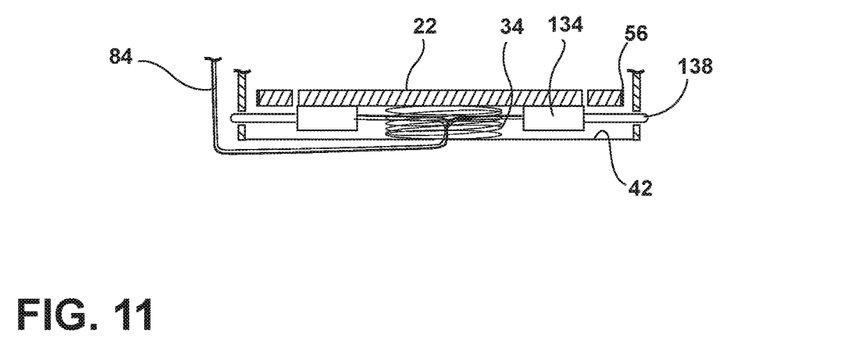
FIG. 11 is a partially schematic fragmentary cross-sectional view of a portion of the cup holder base of FIG. 10 taken along the line XI-XI.

With reference to FIG. 11, a partially schematic fragmentary cross-sectional view of a portion of the cup holder base 22 taken along the line XI-XI is shown. In the examples shown, the spring 34 is compressed between the cup holder base 22 and the console bottom surface 42. Upon sending power to the solenoid 134 using the user interface 46 the cup holder base 22 will extend upwards into the cup holder 14 upon retraction of the plunger 138 out of the assembly hole 130. The cup holder base 22 can be lowered again upon initiation of the solenoid 134 and application of pressure to the cup holder base 22 by pushing it down until the power to the solenoid 134 is stopped and the plunger 138 extends back into the closest assembly hole 130.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An adjustable vehicle cup holder assembly comprising:
   a cup holder base having a depth relative to a top surface of a cup holder configured to position a beverage container;
   a spring positioned between a bottom edge of the cup holder base and a console bottom surface;
   an interface defining a member opening and including a sliding member positioned within the member opening; and
   a finger operated actuator assembly mechanism configured to adjust the depth of the cup holder base controlled by the interface.

2. The vehicle cup holder assembly of claim 1, wherein the interface comprises a knob, a switch, a toggle, a button, and/or a touch screen.

3. The vehicle cup holder assembly of claim 1, wherein a side wall of the cup holder comprises a plurality of assembly holes to house an actuator rod.

4. The adjustable vehicle cup holder assembly of claim 1, wherein the sliding member is coupled to an actuator rod and is configured to retract and extend the actuator rod.

5. The adjustable vehicle cup holder assembly of claim 1, further comprising:
a side member coupled to the cup holder base forming a single member.

6. The adjustable vehicle cup holder assembly of claim 1, further comprising:
an actuator spring positioned between two retaining members and coupled to an actuator rod.

7. A vehicle cup holder assembly comprising:
a cup holder base having a depth relative to a top surface of a cup holder configured to position a beverage container;
an interface; and
a mechanism controlled by the interface to adjust the depth of the cup holder base, wherein the mechanism is selected from the group consisting of a motorized assembly and a solenoid assembly.

8. The vehicle cup holder assembly of claim 7, wherein a spring is positioned between a bottom edge of the cup holder base and a console bottom surface.

9. The vehicle cup holder assembly of claim 7, wherein the interface comprises an up/down switch, a knob, a switch, a toggle, a button, and/or a touch screen.

10. The vehicle cup holder assembly of claim 7, wherein the motorized assembly comprises a motor, a first motor pinion gear, and a first movable vertical rack coupled to the cup holder base.

11. The vehicle cup holder assembly of claim 10, further comprising:
a side member coupled to the cup holder base forming a single member.

12. The vehicle cup holder assembly of claim 11, further comprising:
a second pinion gear movably coupled to a second vertical rack and coupled to the cup holder base.

13. The vehicle cup holder assembly of claim 10, wherein the first moveable vertical rack is coupled to the cup holder base forming a single member.

14. The vehicle cup holder assembly of claim 7, further comprising:
a plunger coupled to the solenoid assembly wherein a side wall of the cup holder comprises a plurality of assembly holes to house the plunger.

15. The vehicle cup holder assembly of claim 14, further comprising:
a side member coupled to the cup holder base forming a single member.

16. The vehicle cup holder assembly of claim 15, wherein the second pinion gear is coupled to the side member.

17. A method for adjusting a depth within a cup holder, comprising the steps of:
positioning a container within the cup holder;
initiating an interface to activate a mechanism selected from the group consisting of a finger operated actuator assembly, a motorized assembly, and a solenoid assembly to raise or lower the cup holder base; and
adjusting the cup holder base to one of a plurality of different depths that accommodates the container.

18. The method of claim 17, wherein the mechanism is a motorized assembly and the user interface is an up/down switch; and wherein the motorized assembly comprises a motor, a motor pinion gear, and a movable vertical rack coupled to the cup holder base.

19. The method of claim 17, wherein the mechanism is a finger operated actuator assembly including a sliding member coupled to an actuator rod and the user interface is a member opening; and wherein a side wall of the cup holder comprises a plurality of assembly holes to house the actuator rod.

20. The method of claim 17, wherein the mechanism is a solenoid assembly coupled to a plunger and the user interface is an initiator switch; and wherein a side wall of the cup holder comprises a plurality of assembly holes to house the plunger.

* * * * *